US012583635B2

(12) United States Patent
Messick et al.

(10) Patent No.: US 12,583,635 B2
(45) Date of Patent: Mar. 24, 2026

(54) UTILIZING MULTI-DIRECTIONAL ENERGY-ABSORBING LANDING GEAR FOR VERTICAL TAKEOFF AND LANDING

(71) Applicant: Textron Systems Corporation, Hunt Valley, MD (US)

(72) Inventors: Matthew James Messick, Abingdon, MD (US); Donovan Ray McClelland, Baltimore, MD (US); Edward Charles Volz, Rosedale, MD (US); Adam Ross Ferreira, Red Lion, PA (US)

(73) Assignee: Textron Systems Corporation, Hunt Valley, MD (US)

(*) Notice: Subject to any disclaimer, the term of this patent is extended or adjusted under 35 U.S.C. 154(b) by 0 days.

(21) Appl. No.: 19/014,688

(22) Filed: Jan. 9, 2025

(65) Prior Publication Data

US 2025/0229921 A1     Jul. 17, 2025

Related U.S. Application Data

(60) Provisional application No. 63/620,339, filed on Jan. 12, 2024.

(51) Int. Cl.
| | |
|---|---|
| *B64U 60/50* | (2023.01) |
| *B64U 10/20* | (2023.01) |
| *B64U 10/25* | (2023.01) |

(52) U.S. Cl.
CPC ............. *B64U 60/50* (2023.01); *B64U 10/20* (2023.01); *B64U 10/25* (2023.01)

(58) Field of Classification Search
CPC ......... B64C 25/06; B64C 25/32; B64C 25/52; B64U 10/20; B64U 10/25; B64U 60/50
See application file for complete search history.

(56) References Cited

U.S. PATENT DOCUMENTS

| | | | | |
|---|---|---|---|---|
| 4,645,143 | A | * | 2/1987 | Coffy .................... B64C 25/52 244/108 |
| 5,224,669 | A | * | 7/1993 | Guimbal ................ B64C 25/52 244/108 |
| 7,571,876 | B2 | | 8/2009 | Bachmeyer et al. |
| 8,020,807 | B2 | | 9/2011 | Bachmeyer et al. |
| 8,448,899 | B2 | | 5/2013 | Luce |
| 8,480,026 | B2 | | 7/2013 | Luce |
| 8,967,534 | B2 | | 3/2015 | Bachmeyer et al. |
| 9,592,908 | B2 | | 3/2017 | Gentry |
| 10,549,847 | B2 | | 2/2020 | Dauphin et al. |
| 10,556,673 | B2 | | 2/2020 | Gurvich et al. |
| 10,589,848 | B2 | | 3/2020 | Dauphin et al. |
| 11,254,423 | B2 | | 2/2022 | Morris et al. |

(Continued)

*Primary Examiner* — Tye William Abell

(74) *Attorney, Agent, or Firm* — BainwoodHuang

(57) ABSTRACT

An unmanned aerial vehicle (UAV) includes a UAV body constructed and arranged to carry a payload, a set of UAV wings coupled with the UAV body, and a set of undercarriage apparatus coupled with at least one of the UAV body and the set of UAV wings. The set of UAV wings is constructed and arranged to provide lift to the UAV. At least one undercarriage apparatus of the set of undercarriage apparatus includes an elastomeric vehicle mount, a leg, and a coupling constructed and arranged to couple the leg with the elastomeric vehicle mount. The elastomeric vehicle mount is constructed and arranged to absorb energy provided from the leg through the coupling.

20 Claims, 17 Drawing Sheets

120 / 200

600

610

640   642

210

660

644

630

Z

X   Y

(56) References Cited

U.S. PATENT DOCUMENTS

| 11,332,238 | B2 | 5/2022 | Tischhauser | |
|---|---|---|---|---|
| 2019/0033889 | A1* | 1/2019 | von Flotow | B64U 70/30 |
| 2019/0248464 | A1* | 8/2019 | Ye | B64U 60/50 |
| 2022/0055740 | A1 | 2/2022 | Foster et al. | |
| 2023/0140387 | A1 | 5/2023 | Infanti et al. | |
| 2024/0253775 | A1* | 8/2024 | Collado | B64C 25/36 |

* cited by examiner

1234

1512

UTILIZING MULTI-DIRECTIONAL ENERGY-ABSORBING LANDING GEAR FOR VERTICAL TAKEOFF AND LANDING

CROSS REFERENCE TO RELATED APPLICATIONS

This application is a regular utility application based on earlier-filed U.S. Application No. 63/620,339 filed on Jan. 12, 2024, entitled "Multi-directional Energy-absorbing Landing Gear for Vertical Takeoff and Landing", the contents and teachings of which are hereby incorporated by reference in their entirety.

TECHNICAL FIELD

This disclosure relates generally to aircraft, and more specifically to vertical-takeoff-and-landing (VTOL) aircraft with energy-absorbing landing gear.

BACKGROUND

A conventional drone, which is configured for forward flight, may have additional vertical-takeoff-and-landing (VTOL) capabilities. Accordingly, the drone may take off and land vertically, but also transition into and out of forward flight.

For VTOL capability, the drone includes propellers that provide vertical lift, and rigid landing legs that maintain the fuselage and wings of the drone above the ground during vertical takeoff and landing. Additionally, the connection between the rigid landing legs and the rest of the drone is relatively stiff/inflexible to enable the drone to endure vertical landings over time.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Unfortunately, relatively rigid/stiff landing features on a drone with vertical-takeoff-and-landing (VTOL) capabilities (e.g., rigid landing legs, stiff connections between the rigid landing legs and the rest of the drone, etc.) cause the remaining structure of the drone to absorb the full energy of landing impact. In a relatively normal rapid decent situation, the rigid landing legs and/or other parts of the drone may even become damaged (e.g., cracked, bent, dented, etc.) from the shock and/or related forces stemming from impacting the ground.

To avoid such damage, the strength of the landing legs and/or the rest of the drone may be reinforced with use of stiffer/heavier material (thicker material, additional welds, strapping, etc.). However, the weight of such added material reduces the drone's operating range, efficiency, handling, etc. and further stiffens the structure, reducing compliance. Moreover, the additional weight may impose other requirements such as the need for stronger/heavier motors, larger propellers, and so on. What is needed, therefore, is a way to provide vertical landing capabilities which do not require reinforcement with stiffer/more rigid material and which do not significantly add weight.

The above need is addressed at least in part by provisioning a VTOL vehicle with energy-absorbing landing gear. Along these lines, improved techniques are directed to utilization of an undercarriage apparatus having an elastomeric vehicle mount to absorb energy during landing. Along these lines, the elastomeric vehicle mount may allow a leg to extend radially therefrom and absorb impact and/or deflection energy from the leg. When such undercarriage apparatus are used on an unmanned aerial vehicle (UAV), the undercarriage apparatus are able to dampen forces imparted on the legs such that less energy is transferred into the UAV during landing. Additionally, due to compliance/energy absorption that occurs within the undercarriage apparatus, there is less tendency/opportunity for bouncing and/or UAV drift. Rather, the UAV is able to land softly and safely. Moreover, such undercarriage apparatus alleviate the need for stronger/heavier material to reinforce the UAV. Accordingly, the UAV may remain lighter thus improving maneuverability, range, performance, and so on.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
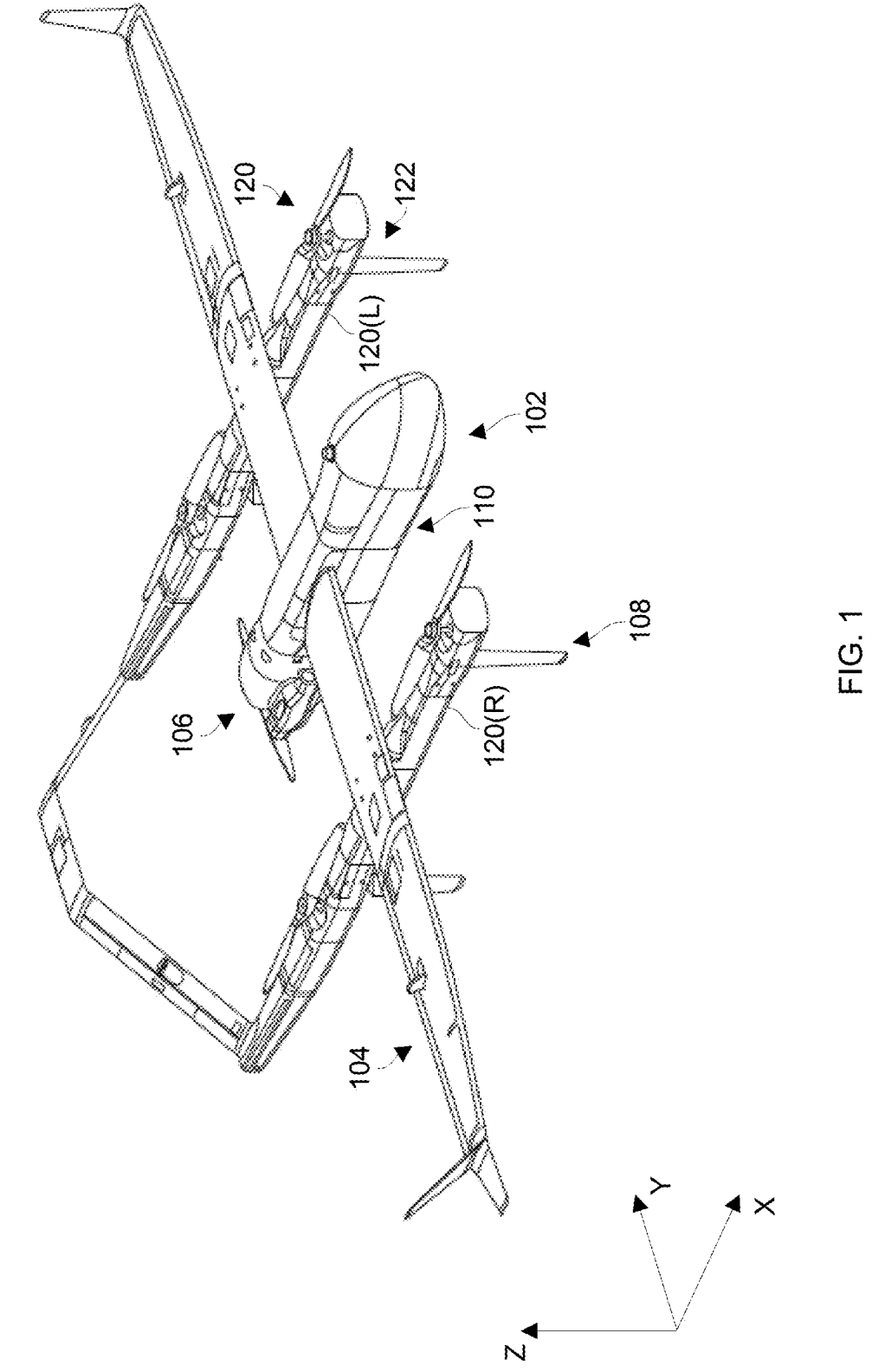
FIG. 1 is a perspective view of an unmanned aerial vehicle (UAV) having energy-absorbing landing gear in accordance with one or more embodiments.

FIG. 1 shows an unmanned aerial vehicle (UAV) 100 having energy-absorbing landing gear in accordance with one or more embodiments. The UAV 100 includes a UAV body 102, a set of wings/control surfaces 104, a propulsion subsystem 106, a VTOL subsystem 108, and control equipment 110.

The UAV body (or fuselage) 102 is constructed and arranged to serve as the primary structure of the UAV 100. Along these lines, the UAV body 102 supports the set of wings/control surfaces 104, the propulsion system 106, the VTOL subsystem 108 and the control equipment 110 among other things (e.g., payloads, cargo, other mission related apparatus, etc.). The UAV body 102 further provides protection to the various componentry internal to the UAV body 102 and improves aerodynamics.

The set of wings/control surfaces 104 are constructed and arranged to facilitate horizontal flight and maneuvering. Along these lines, the set of wing/control surfaces 104 provides lift during fixed wing horizontal flight, stability, flight control/steering, and so on.

The propulsion assembly 106 is constructed and arranged to provide horizontal thrust (e.g., propulsion in the positive X-direction). In some arrangements, the propulsion assembly 106 may further facilitate horizontal takeoff and/or landing (e.g., along the Z-axis). Although the propulsion assembly 106 is shown by way of example in FIG. 1 as including a rear facing propeller, the propulsion assembly 106 may include one or more liquid fuel engines, one or more electric engines, more than one propeller for horizontal flight, one or more forward facing propellers, componentry for jet propulsion, combinations thereof, and so on.

The VTOL subsystem 108 is constructed and arranged to provide the UAV 100 with vertical takeoff and landing capabilities. Accordingly, the UAV 100 is able to enter into flight and land without need of runways, launchers, etc. In some arrangements, the propulsion assembly 106 and the VTOL subsystem 108 may share components (e.g., tilting rotors, fuel sources, control circuitry, combinations thereof, etc.).

In accordance with one or more embodiments, the VTOL subsystem 108 includes a set of booms 120 (e.g., a left-side boom 120(L) and a right-side boom 120(R)) constructed and arranged to provide vertical lift and support the UAV 100 over a ground surface. As will be explained in further detail shortly, the set of booms 120 forms a portion the UAV's undercarriage and includes energy-absorbing landing gear so that there is less energy transferred into the remaining structure of the UAV 100 during landing. Additionally, such energy-absorbing landing gear dampens (or softens) impacts so that there is less tendency/opportunity for bouncing and/or UAV drift. Moreover, such energy-absorbing landing gear alleviates the need for stronger/heavier material to reinforce the UAV 100, but instead allows the UAV 100 to remain lighter thus improving maneuverability, range, performance, and so on.

The control equipment 110 is constructed and arranged to electronically control various operations of the UAV 100. Along these lines, the control equipment 110 may control engine speed, angles of control surfaces, horizontal flight maneuvers, VTOL maneuvers, transitions between vertical and horizontal flight, communications with a ground station, data collection, payload operation and/or deployment, and so on. Further details will now be provided with reference to FIGS. 2 through 5.

Figure 2:
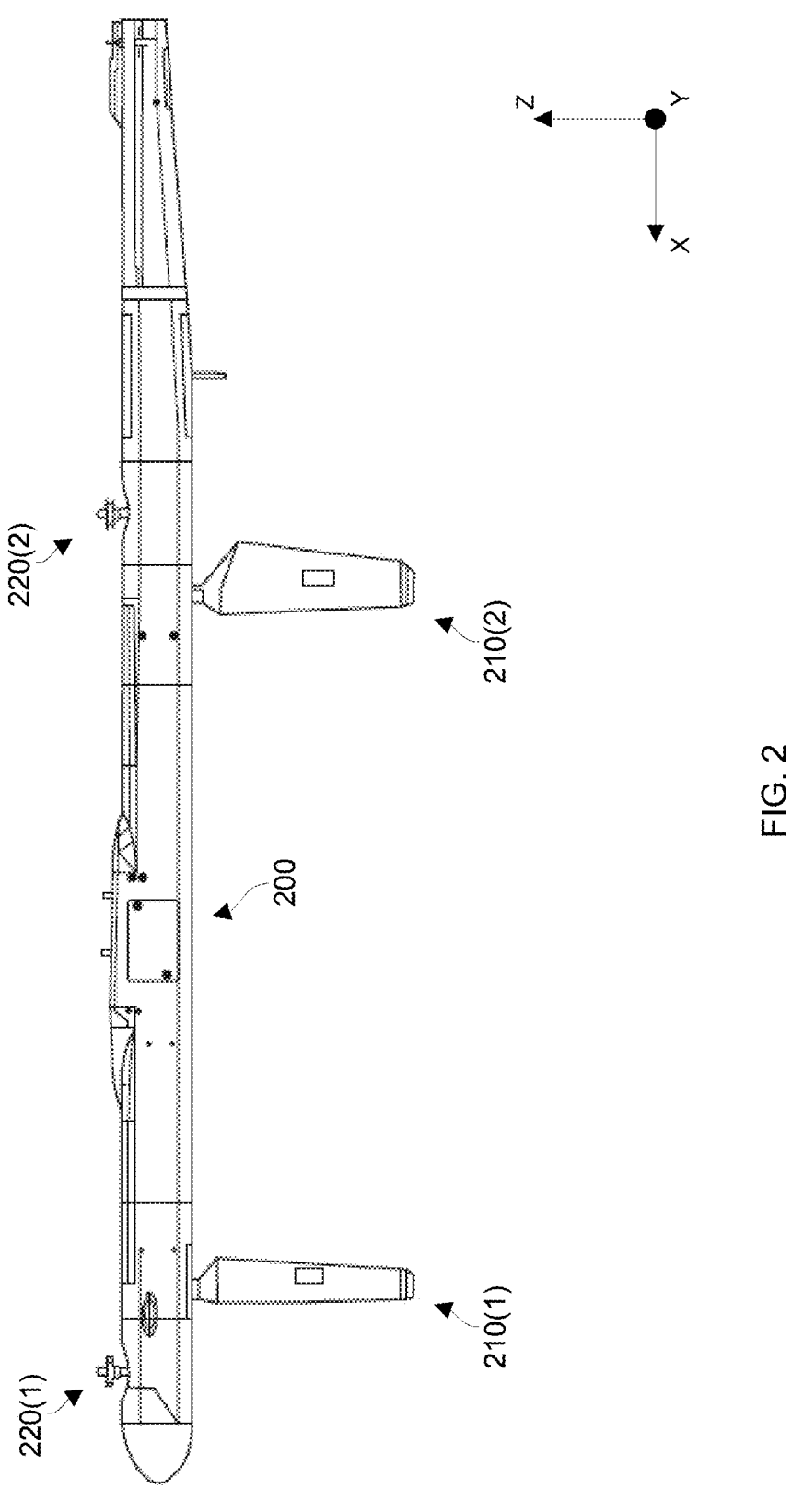
FIG. 2 is a side view of a boom of the UAV in accordance with one or more embodiments.
Figure 3:
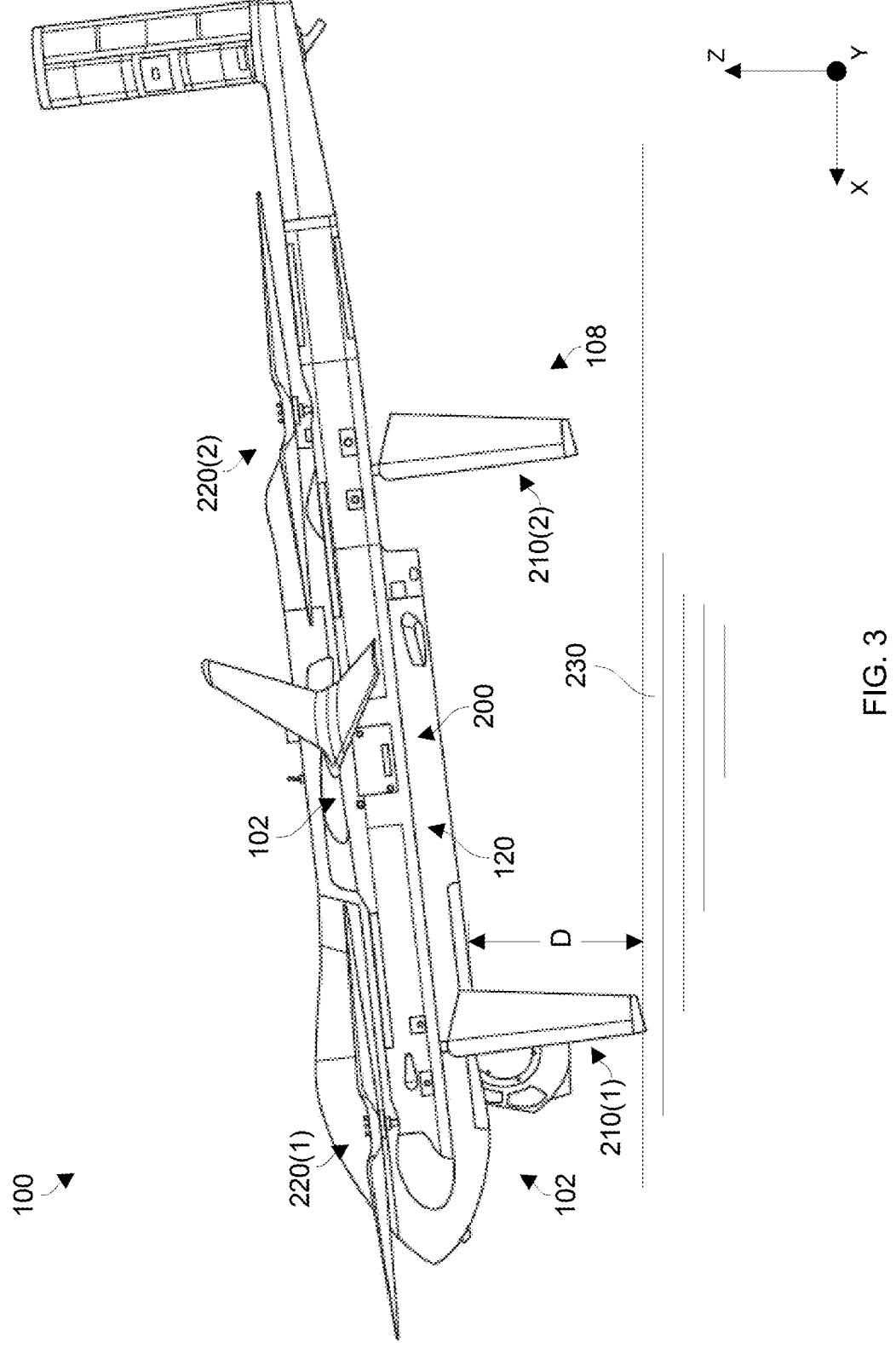
FIG. 3 is a side view of the UAV in accordance with one or more embodiments.
Figure 4:
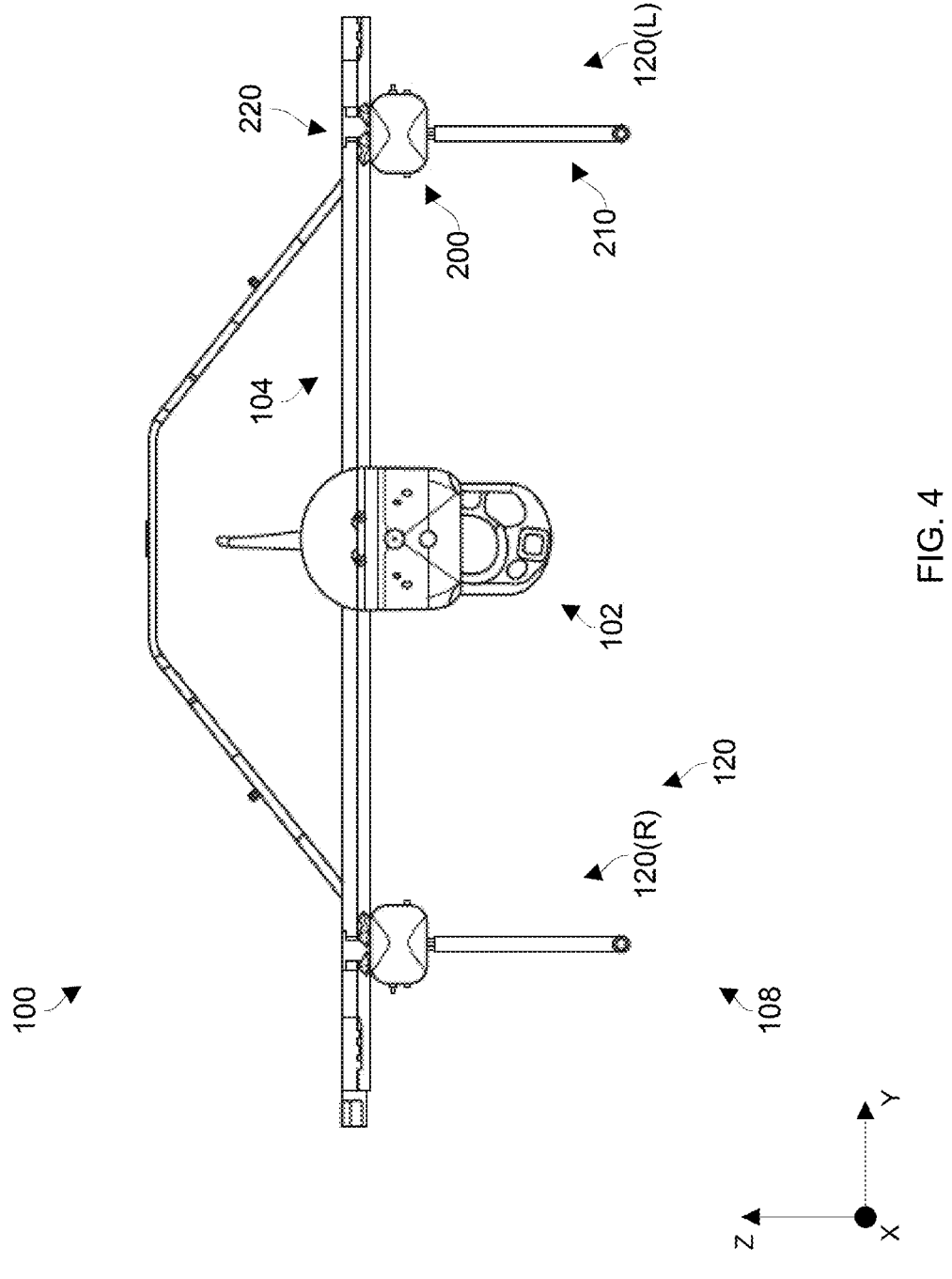
FIG. 4 is a front view of a portion of the UAV in accordance with one or more embodiments.
Figure 5:
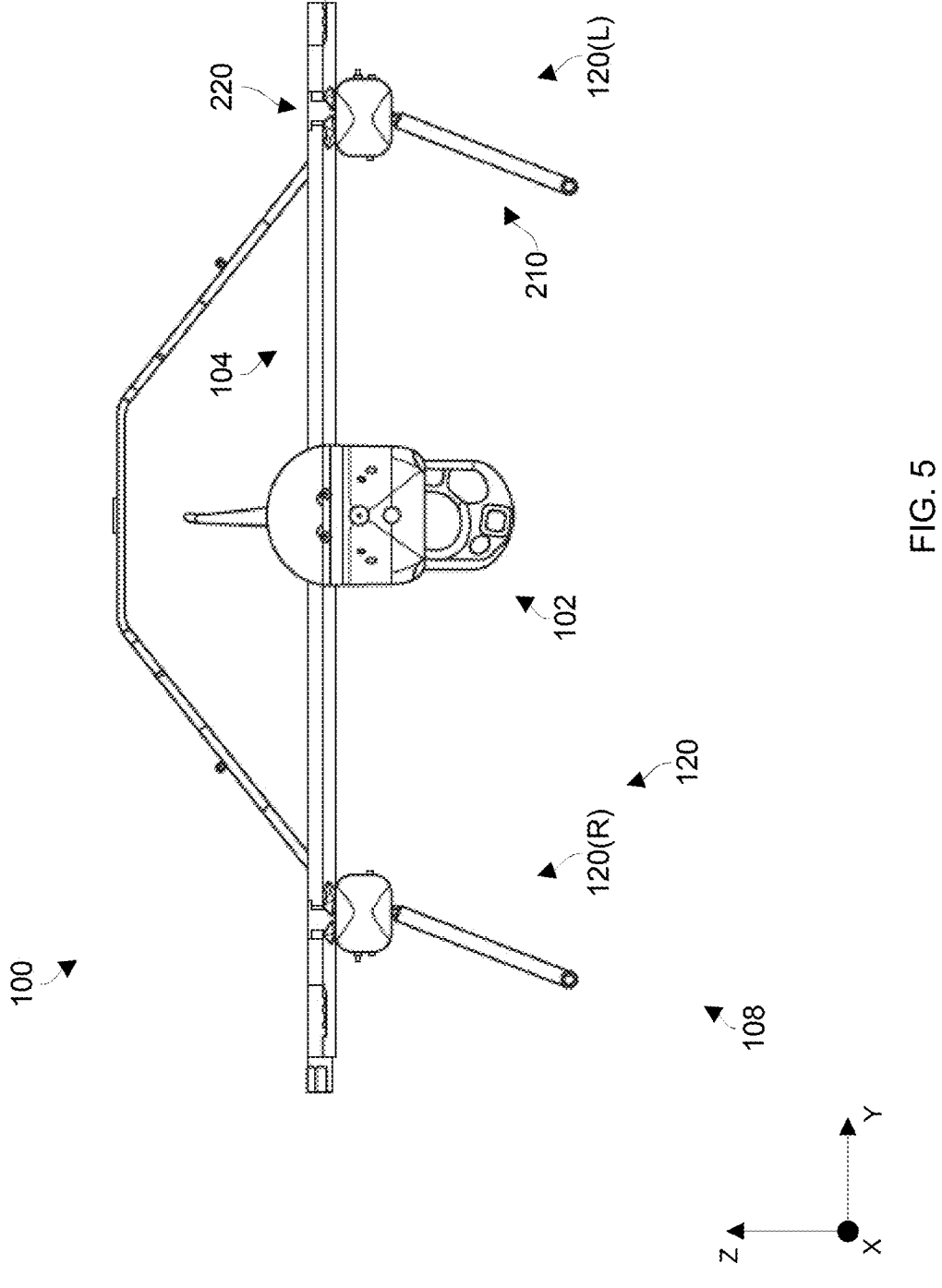
FIG. 5 is another front view of the portion of the UAV in accordance with one or more embodiments.

FIGS. 2 through 5 show energy-absorbing landing gear details in accordance with one or more embodiments. FIG. 2 is a side view of a boom 120 of the VTOL subsystem 108 of the UAV 100. FIG. 3 is a side view of the UAV 100. FIG. 4 is a front view of a portion of the UAV 100 with minimal landing gear deflection. FIG. 5 is a front view of a portion of the UAV 100 with more landing gear deflection. Certain details may have been omitted from FIGS. 2 through 5 for simplification.

As best seen in FIGS. 2 and 3, the boom 120 includes a main section 200, multiple legs 210(1), 210(2) (collectively, legs 210), and multiple propeller assemblies 220(1), 220(2) (collectively, propeller assemblies 220). The main section 200 is elongated in shape is constructed and arranged to attach to a wing/control surface 104 of the UAV 100 (also see FIG. 1). When the main section 200 is attached, the main section 200 aligns with the direction of horizontal flight (e.g., extends along the X-axis).

In some arrangements, the main section 200 is constructed and arranged to fasten to an underside of the wing/control surface 104. Other situations are suitable as well such modifying the main section 200 to fasten to a topside of the wing/control surface 104, integrating the main section 200 with the wing/control surface 104, etc.

The legs 210 are constructed and arranged to attach to and extend from the main section 200 in a downward direction (e.g., the negative Z-direction) to support the main section 200 and other portions of the UAV 100 over a ground surface 230. In some arrangements, the legs 210 include carbon tubes which provide uniform bending stiffness. The separation distance (D) that the legs 210 provide between the ground surface 230 and other portions of the UAV 100 (e.g., a payload underneath the fuselage) is maximized when the legs 210 are substantially perpendicular to the main section 200 of the boom 120 (e.g., see FIG. 3).

It should be understood that the boom 120 is shown as including two legs 210 that extend from the main section 200 by way of example only. In other arrangements, the boom 120 includes a different number of legs 210 which extend from the main section 200 (e.g., one, three, etc.).

In accordance with certain arrangements and as will be explained in further detail shortly, the legs 210 join the main section 200 via compliant members at joints which are constructed and arranged to absorb energy during landing. Such compliant members enable the legs 210 to provide multi-directional deflection capabilities. In some arrangements, the compliant members enable the legs to deflect angularly in any direction (e.g., a 360 degree deflection range). Such a feature richly and reliably enables the UAV 100 to withstand/endure various landing forces without sustaining damage as well as enables the use of lighter weight materials for improved efficiencies.

Additionally, in accordance with certain arrangements and as will be explained in further detail shortly, the legs 210 are formed at least in part using compliant material which is constructed and arranged to flex and absorb energy during landing. In some arrangements, the compliant material enables the legs 210 to bend in any direction. Such a feature enables the UAV 100 to further withstand/endure landing forces without sustaining damage as well as further enables the use of lighter weight materials for improved efficiencies.

FIG. 4 shows the UAV 100 in a resting configuration while the legs 210 are not deflected relative to the booms 120 and while the legs 120 are not bent. Such a situation may exist while the UAV 100 is on a flat surface prior to takeoff or after landing.

FIG. 5 shows the UAV 100 while the legs 210 are deflected relative to the booms 120. Such a situation may exist during landing due to unexpected lateral drift. Here, the legs 120 may or may not be bent. During this time, rather than sustain damage, energy from the impacting the ground is absorbed by the legs 210 and the leg connection points. Moreover, the UAV 100 is able to return to the resting configuration of FIG. 4 following landing. Further details will now be provided with reference to FIGS. 6 through 11.

Figure 6:
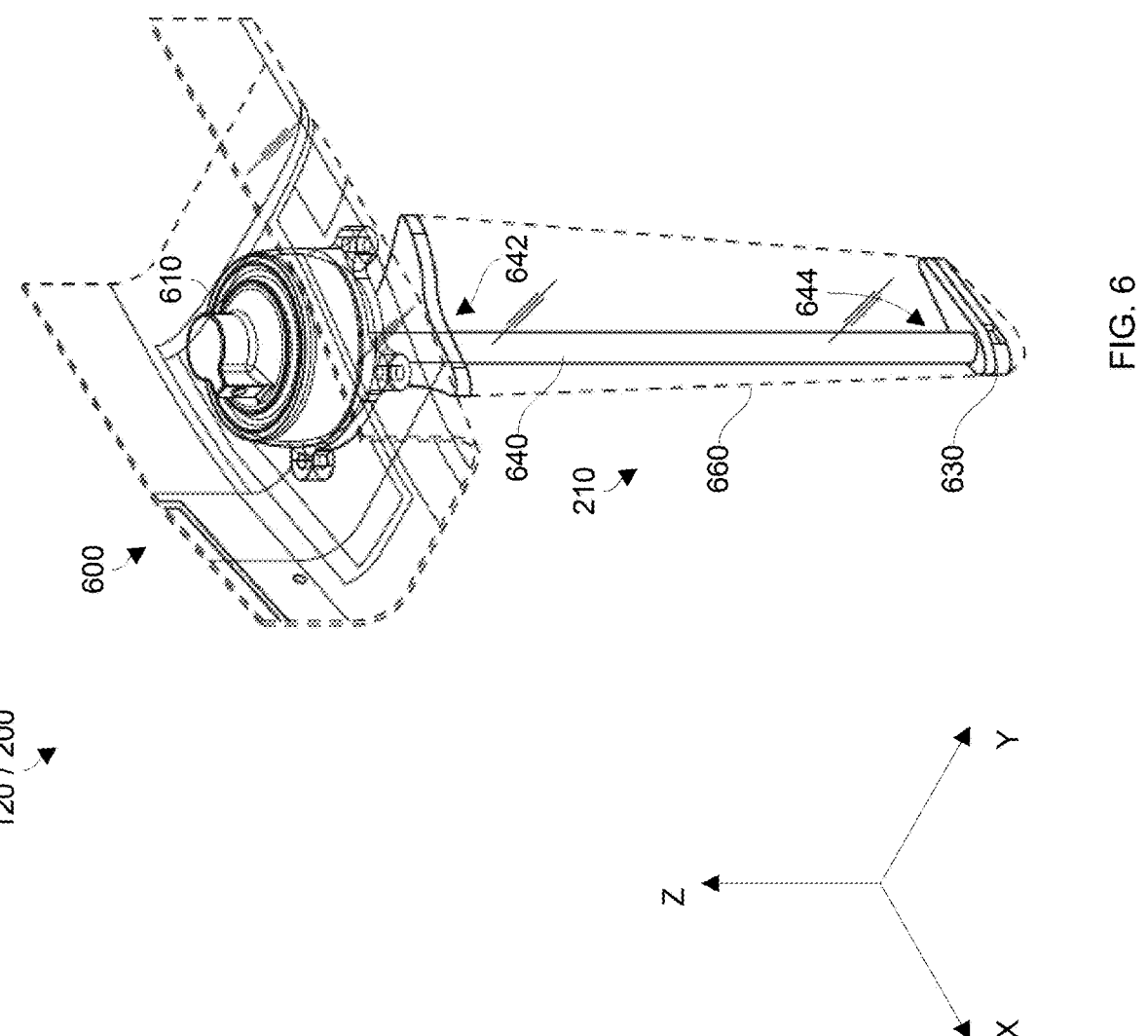
FIG. 6 is a perspective view of an energy-absorption assembly in accordance with one or more embodiments.
Figure 7:
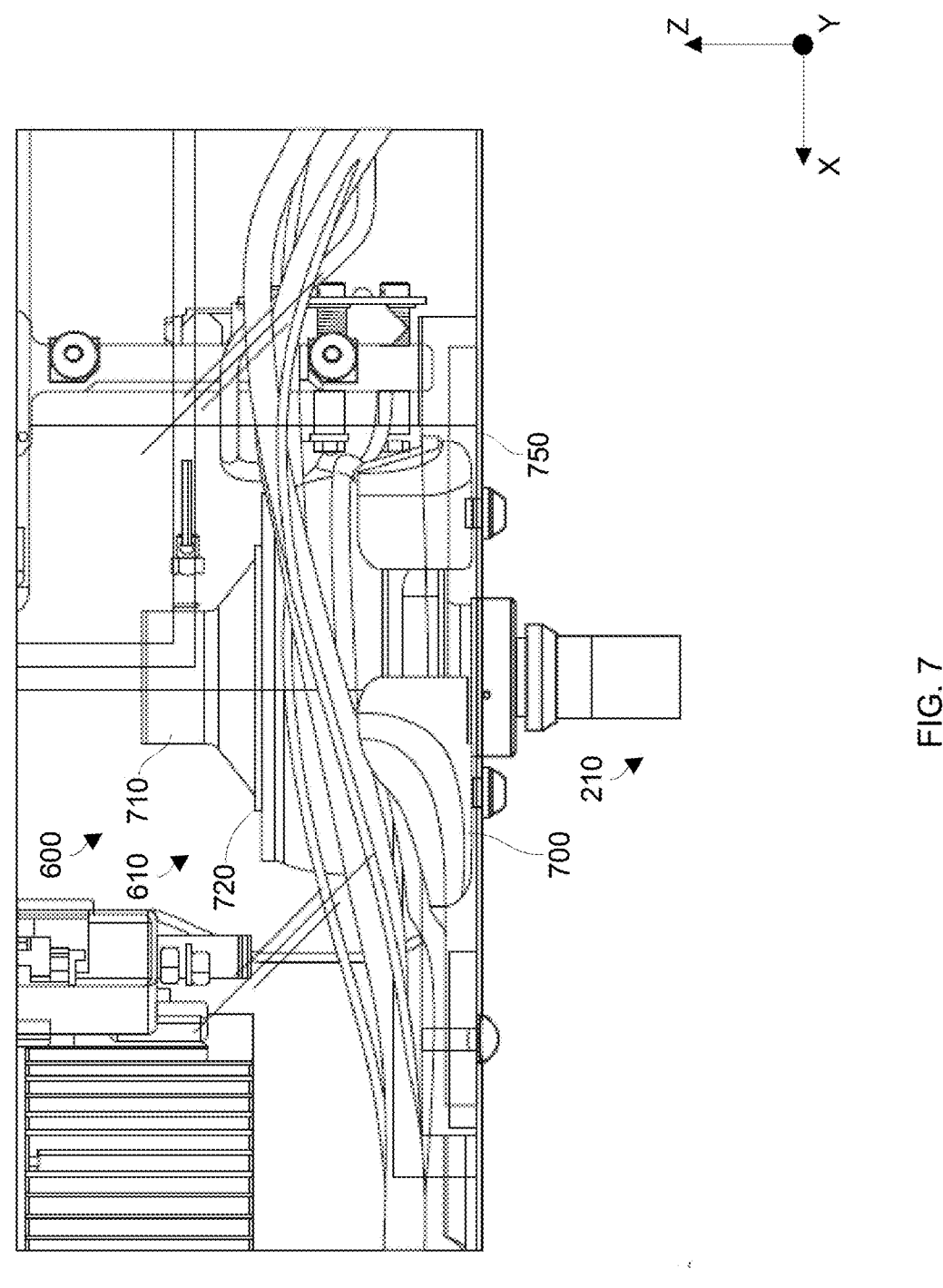
FIG. 7 is a side view of a portion of the energy-absorption assembly in accordance with one or more embodiments.
Figure 8:
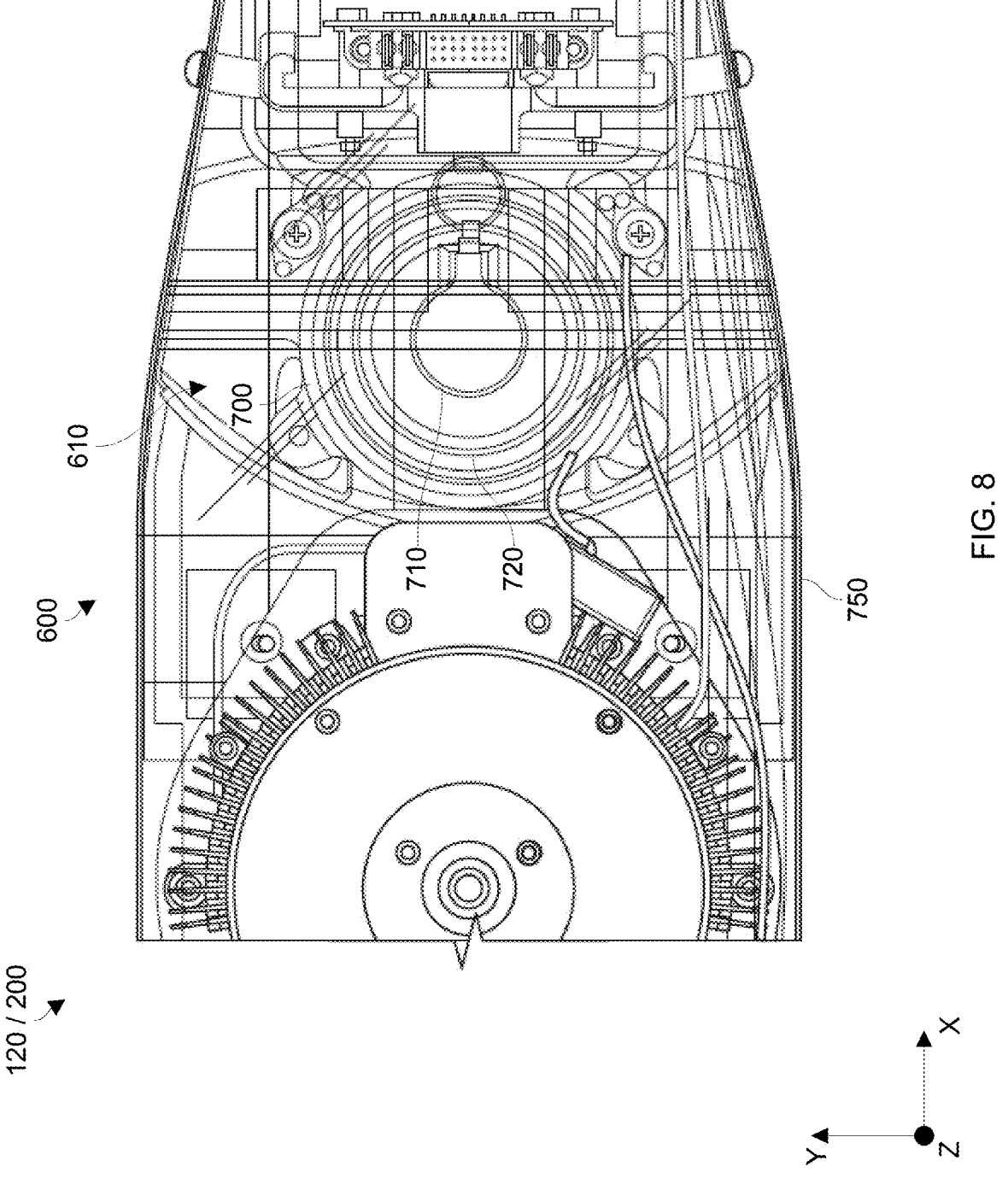
FIG. 8 is a top view of a portion of the energy-absorption assembly in accordance with one or more embodiments.
Figure 9:
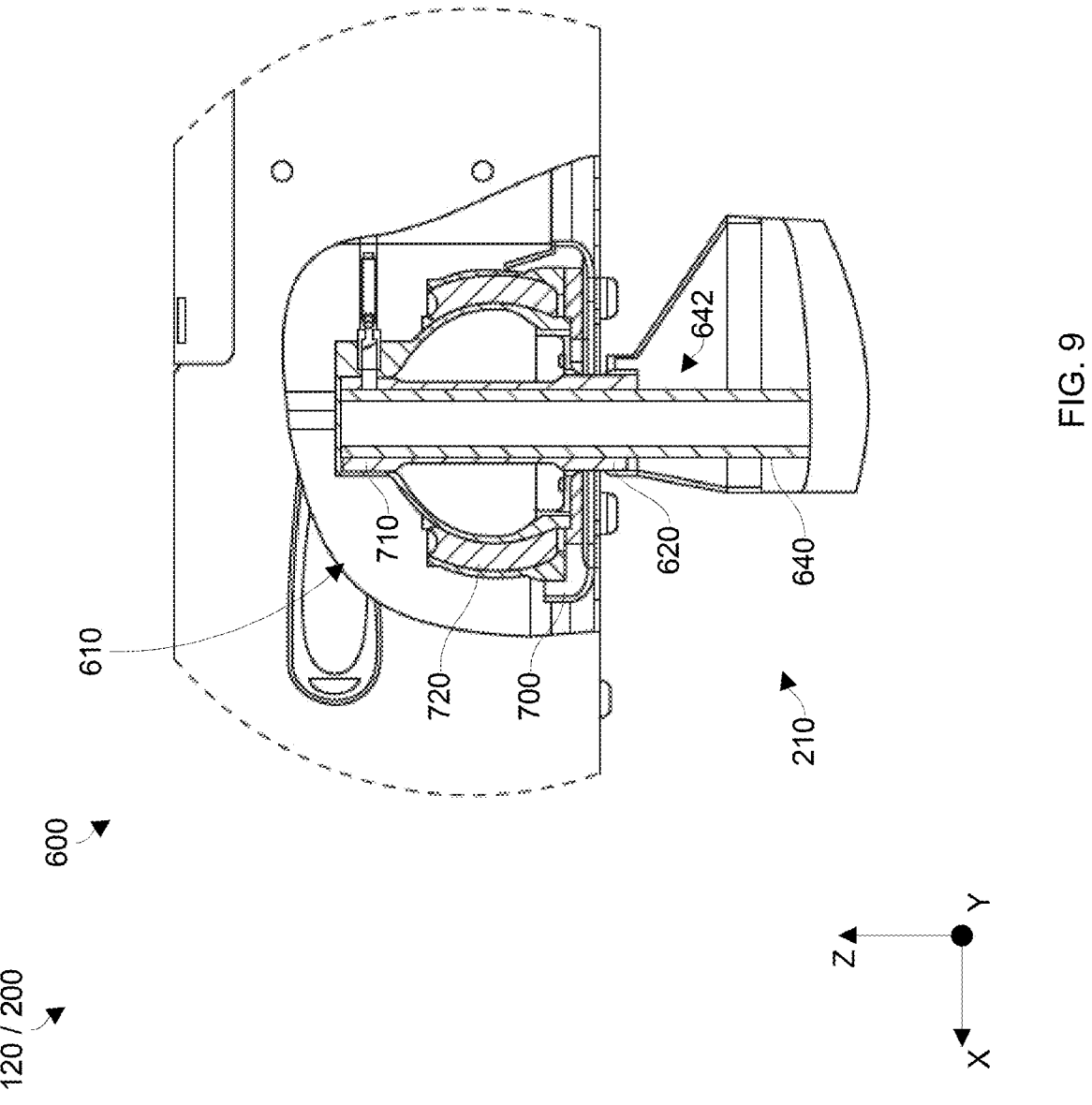
FIG. 9 is a cutaway side view of a portion of the energy-absorption assembly in accordance with one or more embodiments.
Figure 10:
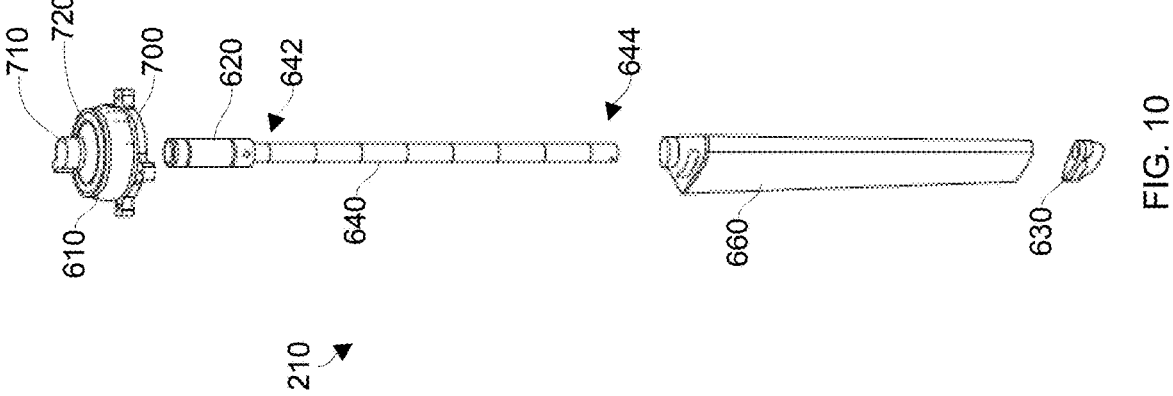
FIG. 10 is an exploded view of a portion of the energy-absorption assembly in accordance with one or more embodiments.
Figure 10:
Figure 10:
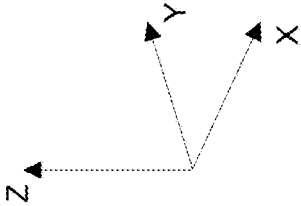
Figure 11:
FIG. 11 is another side view of a portion of the energy-absorption assembly in accordance with one or more embodiments.
Figure 11:
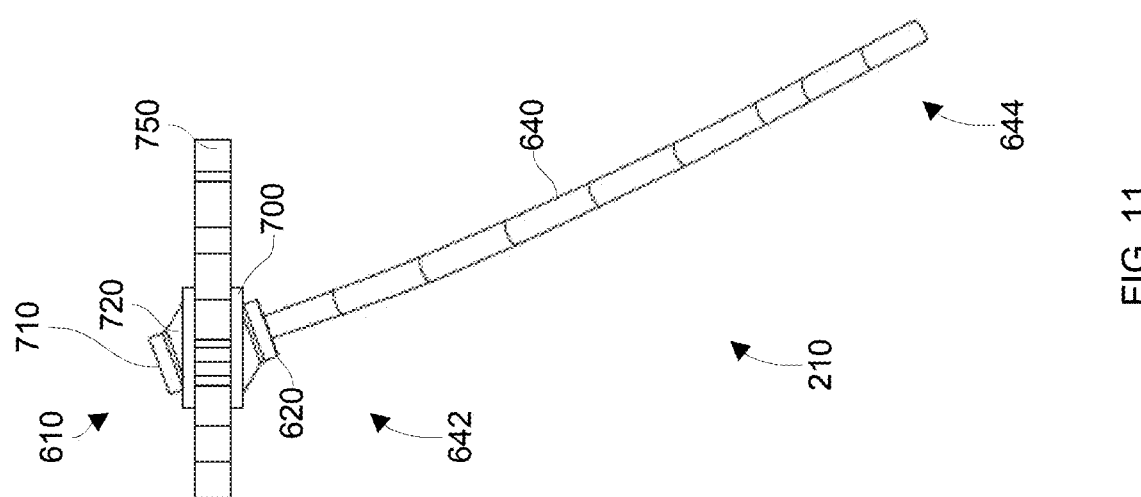

FIGS. 6 through 11 show details of an energy-absorption assembly 600 of the UAV 100 in accordance with one or more embodiments. FIG. 6 is a perspective view of certain details of the energy-absorption assembly 600 which may be hidden from view in other figures. FIG. 7 is side view. FIG. 8 is a top view. FIG. 9 is a cutaway (or cross-sectional) side view. FIG. 10 is an exploded view. FIG. 11 is another side view.

The energy-absorption assembly 600 is an undercarriage apparatus which is constructed and arranged to absorb energy and reduce load the remaining vehicle structure during UAV landing. Such energy absorption may take place via where a leg 210 connects with (or joins) the remaining vehicle structure (e.g., the main section 200 of a boom 120) via a compliant member at the joint. Additionally, such energy absorption may take place within the leg 210 via compliancy of the leg 210.

As best seen in FIGS. 6 and 10, the energy-absorption assembly 600 forms a portion of the undercarriage and includes an elastomeric vehicle mount 610, a coupling 620, the leg 210, and a foot 630. These components provide compliancy/resiliency to withstand forces during landing impact. Not only are such components durable, such components are relatively light weight compared to rigid landing legs, welds, etc. (e.g., metallic structures) that may reduce performance in conventional drones.

The elastomeric vehicle mount (or simply hub) 610 is constructed and arranged to mount to (or form a portion of) the main section 200 of the boom 120. Additionally, the hub 610 is constructed and arranged to operate as a joint or a hinge enabling the leg 210 to provide multi-directional deflection (e.g., due to unexpected UAV drift during landing).

The coupling 620 (e.g., see FIGS. 9 and 10) is constructed and arranged to couple the leg 210 with the hub 610. Along these lines, the coupling 620 serves as a rigid sleeve to richly and reliably hold the leg 210 within the hub 610. As will be explained in further detail shortly, the coupling 620 fits within the hub 610 in a manner that enables the leg 210 to attach to and detach from the hub 610 via simple operations.

The leg 210 includes a tube 640 which is elongated in shape (e.g., along the Z-axis). The tube 640 has an upper end 642 and a lower end 644 opposite the upper end 642. The coupling 620 fastens to the upper end 642 of the tube 640. The foot 630 fastens to the lower end 644 of the tube 640.

The tube 640 is constructed and arranged to separate the hub 610 and the foot 630 to maintain the UAV 100 above a ground surface. In some embodiments, the tube 640 includes carbon material for resiliency, compliancy, flexing, etc. Along these lines, the tube 640 may be formed by wrapping carbon tape around a tool (or form) at an angle with partial overlap (also see FIGS. 10 and 11) and then curing the carbon tape.

The foot 630 is constructed and arranged to contact the ground surface during UAV landing, while the UAV 100 resides on the ground, etc. In some arrangements, the foot 630 is formed of relatively durable material enabling the foot 630 withstand multiple UAV landings over time without sustain wear, damage, etc. In some arrangements, the foot 630 easily connects with and/or disconnects from the tube 640 to enable quick and simple replacement (e.g., via one or more screws).

In some arrangements, the foot 630 has an aerodynamic shape and includes elastomeric material. Accordingly, the foot 630 is light weight, provides energy absorption characteristics, and resists abrasion.

As also best seen in FIGS. 6 and 10, the leg 210 includes an external section (or fairing) 660 through which the tube 640 extends when the leg 210 is fully assembled. The external section 660 is resilient and has an aerodynamic profile which enables the leg 210 to operate as a control surface during flight (e.g., for stability, for directional control, etc.). Along these lines, the outer surface of the external section 660 may align with the foot 630 for a consistent aerodynamic profile.

In some arrangements, the external section 660 tapers off at the top to enable leg deflection (e.g., see the negative X-direction in FIG. 9). In some arrangements, the external section 660 has a foam interior and fiberglass exterior for reduced weight and durability.

As best seen in FIGS. 7 through 9, the hub 610 includes a rigid support 700, an inner member 710, and an elastomeric member 720 disposed between the rigid support 700 and the inner member 710. The hub 610 may reside among other componentry within an internal space defined a body 750 of the main section 200 of the boom 120 (also see FIGS. 2 and 3).

The rigid support (or base portion) 700 of the hub 610 is constructed and arranged to mount to the body 750 of the main section 200 within the internal space (e.g., see FIGS. 7 and 8). The rigid support 700 may be made of material that provides a combination of strength and low weight such as aluminum, other metals, plastics, combinations thereof, etc.

The inner member (or inner portion) 710 of the hub 610 is constructed and arranged to interface with the coupling 620 which connects with the upper end 642 of the tube 640 (e.g., see FIG. 9). The inner member 710 may be made of material that provides a combination of strength and low weight such as aluminum, other metals, plastics, combinations thereof, etc. In some arrangements, the rigid support 700 and the inner member 710 are made of the same material.

The elastomeric member 720 is constructed and arranged to position and hold the inner member 710 relative to the rigid support 700. Instead of purely addressing vertical shock, the elastomeric member 720 effectively and efficiently handles lateral components of a landing as well. Along these lines, the elastomeric member 720 may be a spherical (or cylindrical) elastomer which absorbs both vertical and radial forces.

As best seen in FIGS. 8 and 9, the rigid support 700, the inner member 710, and the elastomeric member 720, and the coupling 620 reside in a coaxial arrangement from which the tube 640 may extend (e.g., along the Z-axis). Accordingly, the hub 610 is able to handle leg deflection (e.g., see FIG. 11)

in multiple directions (e.g., a full 360 degree range for angular deflection of the inner member 730 relative to the rigid support 700).

As mentioned above, the inner member 730 is constructed and arranged to interface with the coupling 710 (e.g., hold the coupling relative to the rigid support 700). As will be explained shortly, the hub 610 may be provisioned with a quick attach/disconnect feature to enable simple and fast installation and/or removal of the leg 210.

In some arrangements, the inner member 730 prevents the leg 210 from being over inserted into the rigid support 700. Here, the inner member 730 defines a top section that limits the coupling 610 from extending beyond the hub 610 in the positive Z-direction.

At this point, it should be understood that the elastomeric member 720 is formed of elastomeric material for compliancy. Additionally, the tube 630 of the leg 210 is flexible. Such features of the energy-absorption assembly 600 reduce energy transfer from the leg 210 to remaining structure of the UAV 100 thus enabling the UAV 100 to endure vertical landings without sustaining damage. Moreover, such features may be implemented using lightweight materials (e.g., elastomer and carbon tape rather than steel, welded joints, etc.) thus improving performance of the UAV 100. Further details will now be provided with reference to FIGS. 12 through 14.

Figure 12:
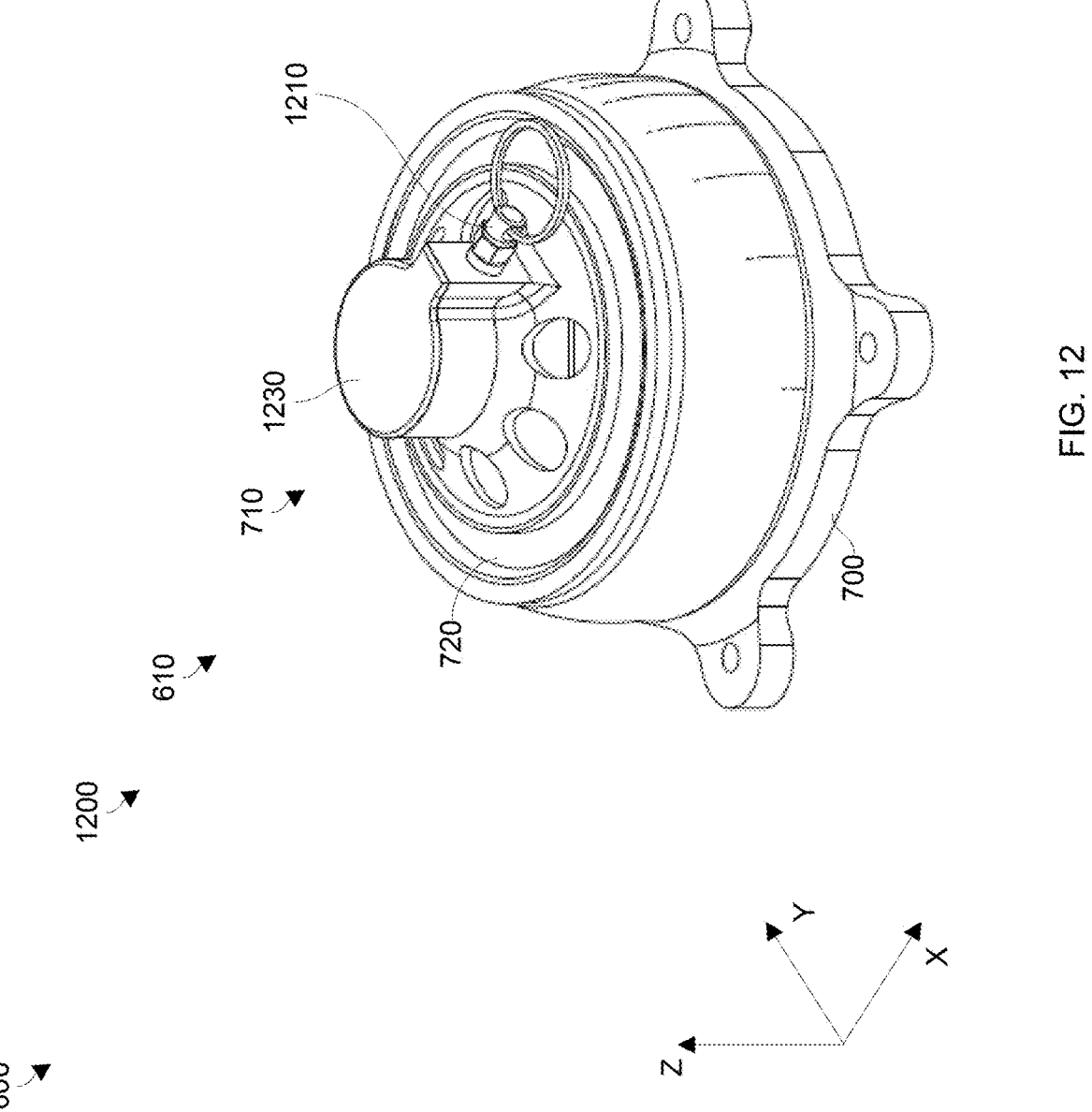
FIG. 12 is a perspective view of certain componentry of a quick attach/disconnect feature in accordance with one or more embodiments.
Figure 13:
FIG. 13 is another perspective view of certain componentry of the quick attach/disconnect feature in accordance with one or more embodiments.
Figure 14:
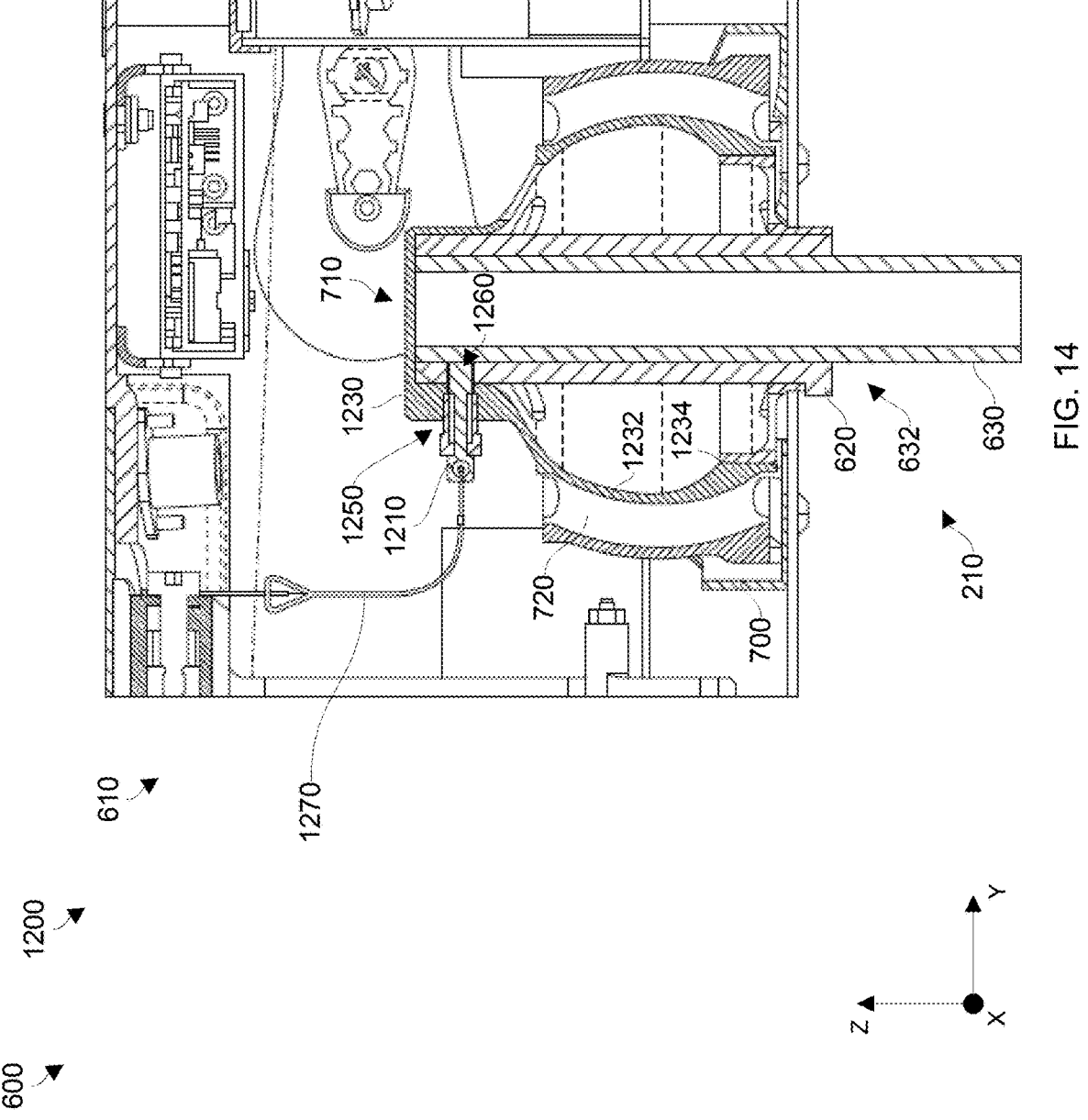
FIG. 14 is a cross-sectional side view of certain componentry of the quick attach/disconnect feature in accordance with one or more embodiments.

FIGS. 12 through 14 show details of a quick attach/disconnect feature 1200 of the energy-absorption assembly 600 in accordance with one or more embodiments. FIG. 12 is a perspective view of certain componentry of the quick attach/disconnect feature 1200. FIG. 13 is another perspective view of certain componentry of the quick attach/disconnect feature 1200. FIG. 14 is a side view of certain componentry of the quick attach/disconnect feature 1200.

As shown in FIGS. 12 through 14, the quick attach/disconnect feature 1200 is formed by the coupling 620, the inner member 710, and a spring-biased release pin 1210. The spring-biased release pin 1210 may be considered to form a portion of the hub 610. As mentioned earlier, the inner member 710 of the hub 610 interfaces with the coupling 620 properly position the leg 210 in the negative Z-direction (e.g., see FIG. 9).

As best seen in FIG. 14, the inner member 730 includes a cap section 1230, a middle section 1232, and a lower section 1234. These sections are held within a central region of the hub 610 by the elastomeric member 720 and the rigid support 700.

The cap section 1230 of the inner member 730 is constructed and arranged to restrict the coupling 620 in the positive Z-direction (e.g., during installation of the leg 210). Additionally, the cap section 1230 defines an aperture 1250 to hold the spring-biased release pin 1210 (e.g., see FIG. 13).

The middle section 1232 of the inner member 730 is constructed and arranged to extend within an inner surface of the elastomeric member 720 to be held in place by the elastomeric member 720 and the rigid support 700. In some arrangements, the cap section 1230 and the middle section 1232 are integrated to form a single body (e.g., see FIG. 14).

The lower section 1234 of the inner member 730 is constructed and arranged to engage with the middle section 1232. Accordingly, all of the sections 1230, 1232, and 1234 can move together within the rigid support 700 due to compression, deformation, etc. of the elastomeric member 720.

As best seen in FIG. 14, actuation of the spring-biased release pin 1210 enables the leg 210 to disconnect from and attach to the hub 610 (e.g., by overcoming a spring force).

Along these lines, the spring-biased release pin 1210 is biased via the spring force through the aperture 1250 toward the coupling 620 to enable a first end to engage a notch (or hole) 1260 in the coupling 620 to lock the leg 210 within the hub 610 (e.g., the spring-biased release pin 1210 is urged in the positive Y-direction). To quickly and easily remove the leg 210 from the hub 610, the spring-biased release pin 1210 is moved (or actuated) away from the coupling 710 and out of engagement with the notch 1260. In some arrangements, a second end of the spring-biased release pin 1210 couples with a cord or similar mechanism 1270 for remote actuation (FIG. 14). Further details will now be provided with reference to FIGS. 15 through 17.

Figure 15:
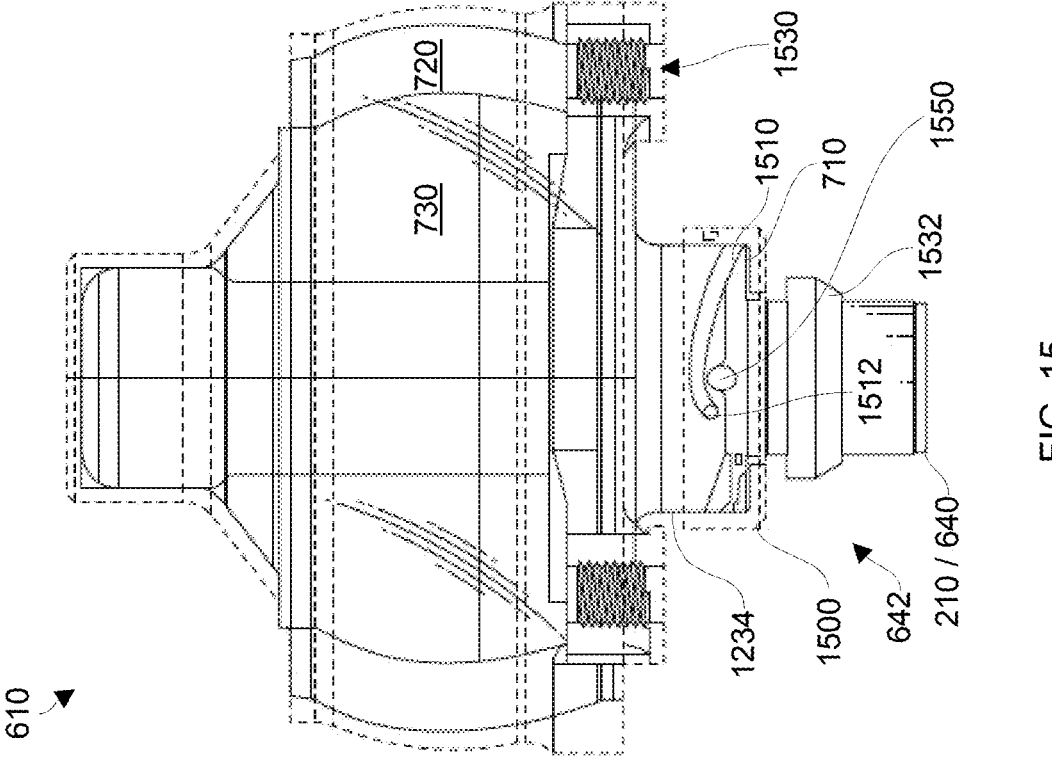
FIG. 15 is a side view of further details of an energy-absorption assembly in accordance with one or more embodiments.
Figure 16:
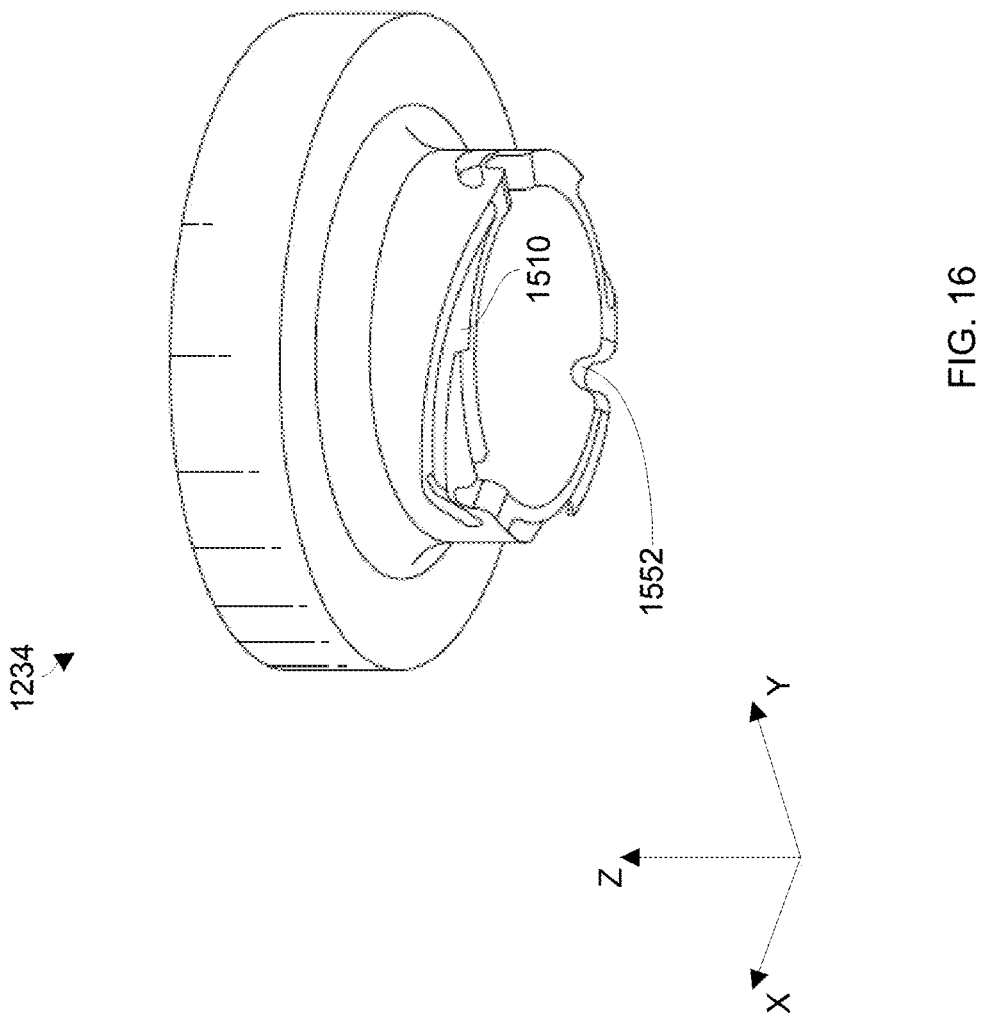
FIG. 16 is a perspective view of a portion of the energy-absorption assembly in accordance with one or more embodiments.
Figure 17:
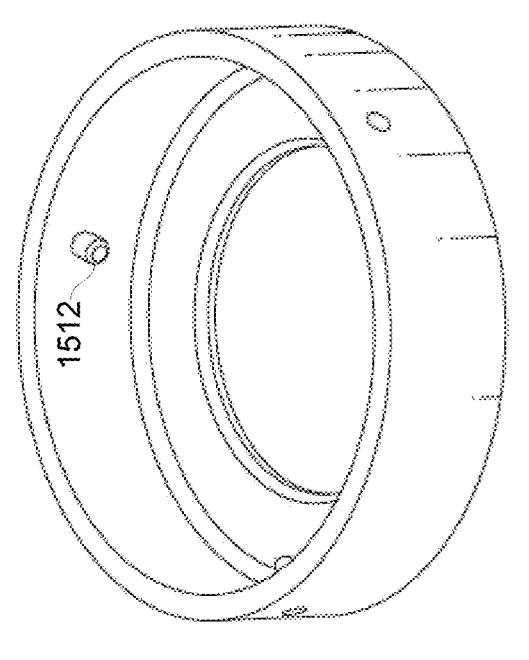
FIG. 17 is a perspective view of another portion of the energy-absorption assembly in accordance with one or more embodiments.
Figure 17:
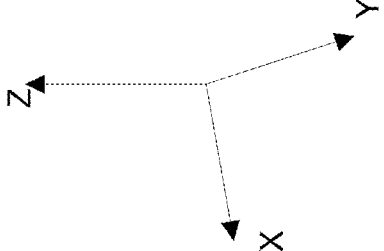

FIGS. 15 through 17 show further details of the energy-absorption assembly 600 in accordance with one or more embodiments. FIG. 15 is a side view with certain details in phantom to better illustrate certain internal details. FIG. 16 is a perspective view of the lower section 1234 of the inner member 730 of the hub 610 (also see FIG. 14). FIG. 17 is a perspective view of complementary fitting 1500 which engages with the lower section 1234.

As shown in FIG. 15 through 17, the complementary fitting 1500 is disposed around the upper end 642 of the tube 640 of the leg 210 and is constructed and arranged to engage with the lower section 1234 of the inner member 730 of the hub 610. Along these lines, the complementary fitting 1500 and the lower section 1234 have complementary diameters to enable the complementary fitting 1500 to fit over a bottom portion of the lower section 1234.

Additionally, one of the complementary fitting 1500 and the lower section 1234 defines a set of channels 1510 (e.g., arc-shaped grooves), and the other of the complementary fitting 1500 and the lower section 1234 defines a set of protrusions 1512 constructed and arranged to fit within the set of channels 1510. FIGS. 15 through 17 show, by way of example only, the lower section 1234 as defining the set of channels 1510, and the complementary fitting 1500 as defining the set of protrusions 1512. However, in other embodiments, the complementary fitting 1500 defines the set of channels 1510, and the lower section 1234 defines the set of protrusions 1512.

It should be understood that the leg 210 may be quickly and easily installed by first inserting the coupling 710, which holds the upper end 642 of the tube 640, through the lower section 1234 of the inner member 730 (e.g., in the positive Z-direction) until the set of protrusions 1512 aligns with the set of channels 1510. Next, the leg 210 is rotated relative to the hub 610 such that the set of protrusions 1512 slides within the set of channels 1510 until the leg 210 can no longer be rotated.

Removal of the leg 210 from the hub 610 may be performed quickly and easily as well. To remove the leg 210, the leg 210 is simply rotated in the opposite direction until the set of protrusions 1512 exits the set of channels 1510. Once the set of protrusions 1512 is no longer engaged with the set of channels 1510, the upper end 640 of the leg 210 can be withdrawn from the inner member 730 (e.g., in the positive Z-direction) to fully remove the leg 210.

It should be understood that additional features may be included to augment interaction of the leg 210 and the hub 610. For example, the lower section 1234 of the inner member 730 may be biased by a set of springs 1530 (FIG. 15) in the negative Z-direction relative to one or more other portions of the hub 610. Additionally, a collar 1532 may be positioned around the leg 210 (just below the coupling 710, also see FIG. 14). The collar 1532 restricts the leg 210 (and coupling 710) from over-inserting into the inner member 730. Along these lines, if the leg 210 is inserted fully into the inner member 730, the fitting 1500 prevents the collar 1532 from further inserting into the inner member 730. Instead, the collar 1532 pushes on the fitting 150 which then compresses the set of springs 1530. Accordingly, the set of protrusions 1512 engages with the set of channels 1510. The leg 210 is then rotated to enable the set of protrusion 1512 to reach the end of the set of channels 1510.

At this point, the set of springs 1530 provide biasing force on the leg 210 in the negative Z-direction to hold the leg 210 in place. Along these lines, each channel 1510 is in the form of an upside down "V" to enable a corresponding protrusion 1512 to be retained via the biasing force at the deep end of that channel 1510.

Nevertheless, as mentioned earlier, the leg 210 may be removed by first overcoming the biasing force on the leg 210 (e.g., pushing the leg 210 in the positive Z-direction) and rotating the leg 210 relative to the hub 610. Similarly and as mentioned earlier, leg installation involves overcoming the biasing force on the leg 210 (e.g., pushing the leg 210 in the positive Z-direction) and rotating the leg 210 relative to the hub 610 in the opposite direction.

In some embodiments, the complementary fitting 1500 is loosely rather than rigidly attached to the leg 210. That is, the complementary fitting 1500 is captured between the coupling 710 and the collar 1532, but is able to rotate relative to the leg 210. In these arrangements, the upper end 640 of the leg 210 is simply inserted into the lower section 1234 of the inner member 730, and the complementary fitting 1500 is then rotated relative to the hub 610 to lock the leg 210 to the hub 610.

In some arrangements, one of the coupling 710 and the inner member 730 defines a key 1550 (FIG. 15), and the other of the coupling 710 and the inner member 730 defines a guide 1552 (FIG. 16). Accordingly, alignment of the coupling 710 with the inner member 730 is achieved when the key 1550 properly enters and aligns with the guide 1552 (e.g., via rotation of the leg 210). Once the coupling 710 is properly aligned with the inner member 730 in this manner, the complementary fitting 1500 is installed onto the inner member 730 to lock the leg 210 to the hub 610.

In some embodiments, there are multiple keys 1550 and multiple corresponding guides 1552 to relieve certain stresses into the parts. Such features increase durability and resiliency under repeated landings. It should be understood that the place of keys 1550 and guide 1552 may be such to enforce proper alignment of the leg 210 with the hub 610.

As described above, improved techniques are directed to utilization of energy-absorbing landing gear. Along these lines, improved techniques are directed to utilization of an undercarriage apparatus having an elastomeric vehicle mount (or hub) 610 to absorb energy during landing. Along these lines, the hub 610 may allow a leg 210 to extend radially therefrom and absorb impact and/or deflection energy from the leg 210. When such undercarriage apparatus are used on a UAV 100, the undercarriage apparatus are able to dampen forces imparted on the legs 210 such that less energy is transferred into the UAV 100 during landing. Additionally, due to compliance/energy absorption that occurs within the undercarriage apparatus, there is less tendency/opportunity for bouncing and/or UAV drift. Rather, the UAV 100 is able to land softly and safely. Moreover, such undercarriage apparatus alleviate the need for stronger/heavier material to reinforce the UAV 100. Accordingly, the UAV 100 may remain lighter thus improving maneuverability, range, performance, and so on.

It should be appreciated that conventional VTOL solutions dealt with only vertical shock absorption by adding structure to aircraft for drifting cases. No previous solution handles both vertical shock and drifting loads with an assembly fully within the aircraft.

It should be understood that landing of VTOL aircraft can result in high lateral landing rates due to the environment, namely wind, and autopilot corrections upon approach. Previous designs addressed this issue by carrying significant extra weight within the aircraft structure. This previous approach inherently opposes an objective for the aircraft structure, which is to be as lightweight as possible.

Certain improvements disclosed herein reduce the weight impact on the aircraft by drastically reducing the energy transferred from the landing legs to the rest of the aircraft structure. Such improvements utilize a spherical elastomer assembly to absorb vertical and radial forces. Moreover, although the previous approach deals with purely vertical shock, such improvements effectively and efficiently address the lateral components of a landing.

In accordance with certain embodiments, a rigid outer race is connected to a rigid inner race through a molded elastomer (e.g., see FIG. 9). The rigid outer race connects to the aircraft structure while the inner race accepts the landing leg. The molded elastomer has unique properties chosen for optimal deflections under the highest drift load cases. This assembly then acts as a flexible joint for the landing leg to the aircraft structure, specifically tuned for the landing conditions. The landing leg then is loosely retained while under only gravity and then bottoms out vertically and radially within the inner race during a landing, such that the landing leg imparts all of its moment onto the inner race and connected elastomer.

It should be appreciated that aircrafts typically land in a variety of weather conditions and landing surfaces. Structural integrity to survive these landing conditions usually adds significant weight to the aircraft which negatively impacts endurance and payload capacity—both being critical to the operator.

Certain embodiments disclosed herein utilize a cylindrical elastomer shape at the attachment point of the landing leg which allows for significant load absorption of a variety of landing cases, namely vertical and drift cases. This isolated absorption mechanism allows for significant structural weight reductions through the rest of the aircraft.

It should be appreciated that there are deficiencies in certain conventional aircraft. Along these lines, aircraft typically land in a variety of weather conditions and landing surfaces. Structural integrity to survive these landing conditions usually adds significant weight to the aircraft which negatively impacts endurance and payload capacity—both being critical to the operator.

However, improved techniques may involve utilizing a cylindrical elastomer shape at the attachment point of a landing leg which allows for significant load absorption of a variety of landing cases, namely vertical and drift cases. This isolated absorption mechanism allows for significant structural weight reductions through the rest of the aircraft.

It should be understood that certain characteristics such as material type, material thickness, densities, compressibility, combinations thereof, etc. may be adjusted based on UAV characteristics, scale, scope, mission requirements, etc. Such characteristics may control behavior such as hub deflection, boom deflection, wing deflection, AV pitching, and so on.

One or more embodiments are directed to an undercarriage apparatus which includes an elastomeric vehicle mount, a leg, and a coupling constructed and arranged to couple the leg with the elastomeric vehicle mount. The elastomeric vehicle mount is constructed and arranged to absorb energy provided from the leg through the coupling.

One or more other embodiments are directed to a UAV which includes:

(A) a UAV body constructed and arranged to carry a payload;

(B) a set of UAV wings coupled with the UAV body, the set of UAV wings being constructed and arranged to provide lift to the UAV; and (C) a set of undercarriage apparatus coupled with at least one of the UAV body and the set of UAV wings.

At least one undercarriage apparatus of the set of undercarriage apparatus includes an elastomeric vehicle mount, a leg, and a coupling constructed and arranged to couple the leg with the elastomeric vehicle mount. The elastomeric vehicle mount is constructed and arranged to absorb energy provided from the leg through the coupling.

In some arrangements, compliancy of the elastomeric member of the elastomeric vehicle mount and of the tube provides energy absorption and resiliency during vertical landing of the UAV.

In some arrangements, the elastomeric vehicle mount includes a base portion constructed and arranged to mount to a vehicle, an inner portion constructed and arranged to interface with the coupling, and an elastomeric member disposed between the base portion and the inner portion.

In some arrangements, the elastomeric member is spherical and separates the base portion from the inner portion to enable 360 degree angular deflection of the inner portion relative to the base portion.

In some arrangements, the elastomeric member includes elastomeric material to reduce energy transfer between the leg and the base portion when the coupling couples the leg with the inner portion.

In some arrangements, the coupling defines a cylindrical shape to fasten to an end of the leg. Additionally, the inner portion of the elastomeric vehicle mount defines a complementary cylindrical shape to interface with the coupling. Furthermore, the elastomeric member of the elastomeric vehicle mount extends around the inner portion.

In some arrangements, the leg, the coupling, the inner portion, the elastomeric member, and the base portion are coaxial relative to each other when the coupling fastens to the end of the leg and interfaces with the inner portion of the elastomeric vehicle mount.

In some arrangements, the leg includes a tube which extends along an axis, the tube having an upper end which fastens to the coupling and a lower end opposite the upper end.

In some arrangements, the tube is more compliant to forces orthogonal to the axis than to forces along the axis to withstand orthogonal deflection and absorb energy during orthogonal deflection.

In some arrangements, the tube is formed of carbon tape wrapped at an angle with partial overlap.

In some arrangements, the undercarriage apparatus further includes a foot constructed and arranged to fasten to the lower end of the tube.

In some arrangements, the foot includes compliant material to reduce energy transfer between the foot and the tube.

In some arrangements, the undercarriage apparatus further includes a fairing constructed and arranged to extend around the tube between the upper end and the lower end, the fairing and the foot having a same aerodynamic profile.

In some arrangements, the undercarriage apparatus further includes a spring-biased release pin coupled with the elastomeric vehicle mount. The spring-biased release pin is constructed and arranged to translate radially toward the coupling to secure the coupling to the elastomeric vehicle mount and away from the coupling to release the coupling from the elastomeric vehicle mount when the coupling resides within the elastomeric vehicle mount.

In some arrangements, the elastomeric vehicle mount defines a set of channels. Additionally, the undercarriage apparatus further includes a fitting which encircles the leg and defines a set of protrusions. The fitting is constructed and arranged to capture the coupling within the elastomeric vehicle mount when the fitting is rotated relative to the elastomeric vehicle mount while the set of protrusions engages with the set of channels.

In some arrangements, the undercarriage apparatus further includes a collar disposed at a fixed position on an upper end of the leg, the collar being constructed and arranged to limit insertion of the upper end of the leg into the elastomeric vehicle mount during coupling of the leg with the elastomeric vehicle mount.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical.

Along these lines, the energy-absorption assembly 600 was described above as attaching to a boom 120 by way of example only. In other embodiments, the energy-absorption assembly 600 attaches to a different part of the UAV 100 such as the fuselage, a wing, etc. In some embodiments, one or more energy-absorption assemblies 600 attached to one type of structure (e.g., a boom 120), and one or more energy-absorption assemblies 600 attached to another type of structure (e.g., a wing).

Additionally, the energy-absorption assembly 600 was described above as being utilized on a UAV by way of example only. Other types of equipment are suitable for use as well, e.g., manned aircraft, water vehicles, equipment which drops vertically, and so on. Support for such combinations, permutations and variants is considered to exist within this document.

What is claimed is:

1. An undercarriage apparatus, comprising:

an elastomeric vehicle mount;

a leg; and a coupling constructed and arranged to couple the leg with the elastomeric vehicle mount, the elastomeric vehicle mount being constructed and arranged to absorb energy provided from the leg through the coupling;

wherein the elastomeric vehicle mount defines a set of channels; and wherein the undercarriage apparatus further comprises:

a fitting which encircles the leg and defines a set of protrusions, the fitting being constructed and arranged to capture the coupling within the elastomeric vehicle mount when the fitting is rotated relative to the elastomeric vehicle mount while the set of protrusions engages with the set of channels.

2. The undercarriage apparatus of claim 1, further comprising:

a spring-biased release pin coupled with the elastomeric vehicle mount, the spring-biased release pin being constructed and arranged to translate radially toward the coupling to secure the coupling to the elastomeric vehicle mount and away from the coupling to release the coupling from the elastomeric vehicle mount when the coupling resides within the elastomeric vehicle mount.

3. The undercarriage apparatus of claim 1, further comprising:

a collar disposed at a fixed position on an upper end of the leg, the collar being constructed and arranged to limit insertion of the upper end of the leg into the elastomeric vehicle mount during coupling of the leg with the elastomeric vehicle mount.

4. The undercarriage apparatus of claim 1, wherein the elastomeric vehicle mount includes:

a base portion constructed and arranged to mount to a vehicle;

an inner portion constructed and arranged to interface with the coupling; and an elastomeric member disposed between the base portion and the inner portion.

5. The undercarriage apparatus of claim 4, wherein the elastomeric member is spherical and separates the base portion from the inner portion to enable 360 degree angular deflection of the inner portion relative to the base portion.

6. The undercarriage apparatus of claim 5, wherein the elastomeric member includes elastomeric material to reduce energy transfer between the leg and the base portion when the coupling couples the leg with the inner portion.

7. The undercarriage apparatus of claim 4, wherein the coupling defines a cylindrical shape to fasten to an end of the leg;

wherein the inner portion of the elastomeric vehicle mount defines a complementary cylindrical shape to interface with the coupling; and wherein the elastomeric member of the elastomeric vehicle mount extends around the inner portion.

8. The undercarriage apparatus of claim 7, wherein the leg, the coupling, the inner portion, the elastomeric member, and the base portion are coaxial relative to each other when the coupling fastens to the end of the leg and interfaces with the inner portion of the elastomeric vehicle mount.

9. The undercarriage apparatus of claim 1, wherein the leg includes:

a tube which extends along an axis, the tube having an upper end which fastens to the coupling and a lower end opposite the upper end.

10. The undercarriage apparatus of claim 9, wherein the tube is more compliant to forces orthogonal to the axis than to forces along the axis to withstand orthogonal deflection and absorb energy during orthogonal deflection.

11. The undercarriage apparatus of claim 10, wherein the tube is formed of carbon tape wrapped at an angle with partial overlap.

12. The undercarriage apparatus of claim 9, further comprising:

a foot constructed and arranged to fasten to the lower end of the tube.

13. The undercarriage apparatus of claim 12, wherein the foot includes elastomeric material to reduce energy transfer between the foot and the tube.

14. The undercarriage apparatus of claim 12, further comprising:

a fairing constructed and arranged to extend around the tube between the upper end and the lower end, the fairing and the foot having a same aerodynamic profile.

15. An unmanned aerial vehicle (UAV), comprising:

a UAV body constructed and arranged to carry a payload;

a set of UAV wings coupled with the UAV body, the set of UAV wings being constructed and arranged to provide lift to the UAV; and a set of undercarriage apparatus coupled with at least one of the UAV body and the set of UAV wings, at least one undercarriage apparatus of the set of undercarriage apparatus including:

an elastomeric vehicle mount, a leg, a coupling constructed and arranged to couple the leg with the elastomeric vehicle mount, the elastomeric vehicle mount being constructed and arranged to absorb energy provided from the leg through the coupling, and a spring-biased release pin coupled with the elastomeric vehicle mount, the spring-biased release pin being constructed and arranged to translate radially toward the coupling to secure the coupling to the elastomeric vehicle mount and away from the coupling to release the coupling from the elastomeric vehicle mount when the coupling resides within the elastomeric vehicle mount.

16. The UAV of claim 15, wherein the elastomeric vehicle mount includes:

a base portion constructed and arranged to mount to a vehicle;

an inner portion constructed and arranged to interface with the coupling; and an elastomeric member disposed between the base portion and the inner portion.

17. The UAV of claim 16, wherein the leg includes:

a tube which extends along an axis, the tube having an upper end which fastens to the coupling and a lower end opposite the upper end.

18. The UAV of claim 17, wherein compliancy of the elastomeric member of the elastomeric vehicle mount and of the tube provides energy absorption and resiliency during vertical landing of the UAV.

19. An undercarriage apparatus, comprising:

an elastomeric vehicle mount;

a leg; and a coupling constructed and arranged to couple the leg with the elastomeric vehicle mount, the elastomeric vehicle mount being constructed and arranged to absorb energy provided from the leg through the coupling;

wherein the elastomeric vehicle mount includes:

a base portion constructed and arranged to mount to a vehicle;

an inner portion constructed and arranged to interface with the coupling; and an elastomeric member disposed between the base portion and the inner portion; and wherein the elastomeric member is spherical and separates the base portion from the inner portion to enable 360 degree angular deflection of the inner portion relative to the base portion.

20. The undercarriage apparatus of claim 19, further comprising:

a spring-biased release pin coupled with the elastomeric vehicle mount, the spring-biased release pin being constructed and arranged to translate radially toward the coupling to secure the coupling to the elastomeric vehicle mount and away from the coupling to release the coupling from the elastomeric vehicle mount when the coupling resides within the elastomeric vehicle mount.

* * * * *